(12) United States Patent
Sasaki et al.

(10) Patent No.: US 12,028,653 B2
(45) Date of Patent: Jul. 2, 2024

(54) INSPECTION SYSTEM FOR CONSTRUCTION MACHINE

(71) Applicant: KOBELCO CONSTRUCTION MACHINERY CO., LTD., Hiroshima (JP)

(72) Inventors: Hitoshi Sasaki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 103 days.

(21) Appl. No.: 17/784,255

(22) PCT Filed: Jan. 7, 2021

(86) PCT No.: PCT/JP2021/000300
§ 371 (c)(1),
(2) Date: Jun. 10, 2022

(87) PCT Pub. No.: WO2021/141077
PCT Pub. Date: Jul. 15, 2021

(65) Prior Publication Data
US 2023/0043651 A1    Feb. 9, 2023

(30) Foreign Application Priority Data

Jan. 10, 2020    (JP) .................... 2020-002727

(51) Int. Cl.
*H04N 7/18* (2006.01)
*G01M 3/38* (2006.01)
(Continued)

(52) U.S. Cl.
CPC ............ *H04N 7/181* (2013.01); *H04N 23/90* (2023.01); *G01M 3/38* (2013.01); *G01M 5/0033* (2013.01); *G01M 5/0091* (2013.01)

(58) Field of Classification Search
CPC ........ H04N 7/181; H04N 23/90; H04N 23/69; G01M 3/38; G01M 5/0033; G01M 5/0091; E02F 3/435; E02F 9/205; E02F 9/267

See application file for complete search history.

(56) References Cited

U.S. PATENT DOCUMENTS 6,359,647 B1    3/2002    Sengupta et al.
6,778,097 B1 *  8/2004    Kajita ............... E02F 3/437
                                                342/426

(Continued)

FOREIGN PATENT DOCUMENTS

JP    H05-143714 A    6/1993
JP    H11-298887 A    10/1999
(Continued)

OTHER PUBLICATIONS

The extended European search report dated Dec. 5, 2022 issued in the corresponding EP Patent Application No. 21738498.1.

*Primary Examiner* — Michael E Teitelbaum
(74) *Attorney, Agent, or Firm* — Carrier, Shende & Associates P.C.; Joseph P. Carrier; Jeffrey T. Gedeon

(57) ABSTRACT

A remote control system 1 having a function as an inspection system includes a plurality of cameras 25, 60 which are located in a location environment of a construction machine 10, a captured image processing unit 50*a* configured to cause a display unit 45 to display captured images, and a camera selection unit 50*b* configured to select an inspection camera from the plurality of cameras 25, 60 at a time of inspection of the construction machine 10. The captured image processing unit 50*a* is configured to receive an image captured by the selected inspection camera to include an image of a portion to be inspected and cause the display unit 45 to display the captured image.

15 Claims, 5 Drawing Sheets

(51) Int. Cl.
   *G01M 5/00*      (2006.01)
   *H04N 23/90*     (2023.01)

(56) References Cited

U.S. PATENT DOCUMENTS

| | | | |
|---|---|---|---|
| 2001/0029613 A1 | 10/2001 | Fernandez et al. | |
| 2007/0164873 A1* | 7/2007 | Yamada | E02F 9/26 |
| | | | 340/679 |
| 2019/0073762 A1 | 3/2019 | Kean | |
| 2019/0268571 A1* | 8/2019 | Pettersen | H04N 23/69 |
| 2020/0142923 A1* | 5/2020 | Kusaki | G07C 5/008 |

FOREIGN PATENT DOCUMENTS

| | | |
|---|---|---|
| JP | 2004-343322 A | 12/2004 |
| JP | 2005-273470 A | 10/2005 |
| JP | 2006-221311 A | 8/2006 |
| JP | 2009-068920 A | 4/2009 |
| JP | 2009-105564 A | 5/2009 |
| JP | 2013-221303 A | 10/2013 |
| JP | 2016-053531 A | 4/2016 |
| WO | 00/08856 A1 | 2/2000 |
| WO | 2019/181923 A1 | 9/2019 |

* cited by examiner

INSPECTION SYSTEM FOR CONSTRUCTION MACHINE

TECHNICAL FIELD

The present invention relates to an inspection system for a construction machine

BACKGROUND ART

In a construction machine such as a hydraulic excavator, each part of a machine body thereof is exposed to foreign objects and movable parts such as a boom and an arm are likely to be subjected to a large load, and therefore it is necessary to inspect the presence or absence of damage such as cracks on an outer surface portion, the presence or absence of oil leakage, and the like as appropriate.

In this case, it has been conventionally a common practice that an inspection worker such as an operator who controls a construction machine performs a visual inspection near the construction machine.

For example, as disclosed in Patent Literature 1, there is known an inspection device in which an inspection camera for capturing an image of an engine room is mounted on a support part to be attached to a construction machine so that an inspection worker can visually recognize an image captured by the camera through a display in an operation room of the construction machine.

CITATION LIST

Patent Literature

Patent Literature 1: Japanese Patent Laid-Open No. 2013-221303

SUMMARY OF INVENTION

Technical Problem

It is desirable that an inspection work of a construction machine can be performed even at a place away from the construction machine. In a construction machine to be remotely controlled, an operator or the like who controls the construction machine is present at a place away from the construction machine, and therefore it is particularly desirable that the operator or the like can also perform the inspection work at the remote place.

In this case, in the technique disclosed in Patent Literature 1, it is necessary to attach the camera to the construction machine at the time of inspection, and therefore the operator for performing attachment work of the camera is needed even if the image captured by the camera can be observed by the display at the place away from the construction machine. Furthermore, it is difficult to inspect a plurality of portions of the construction machine by simply attaching one camera to the construction machine. Thus, work for attaching a plurality of cameras to the construction machine or work for changing portions to which the cameras are attached are needed.

On the other hand, in a location environment of construction machine to be remotely controlled, a plurality of cameras which can capture images of the construction machine from the outside are typically located so that an operation condition of the construction machine can be visually recognized Therefore, it is conceivable that the inspection work of the construction machine is performed using these cameras.

The present invention has been made in view of the background described above, and an object of the present invention is to provide a system which enables inspection work of a construction machine to be performed appropriately from a remote place.

Solution to Problem

In order to achieve the above-described object, an inspection system for a construction machine of the present invention comprises:

a plurality of cameras which are located in a location environment of a construction machine so as to capture images of appearance of the construction machine;

a captured image processing unit which is located outside of the construction machine so as to receive images captured by each of the plurality of cameras and comprises a display unit configured to display the received captured images; and a camera selection unit configured to select an inspection camera from the plurality of cameras at a time of inspection of the construction machine, the inspection camera serving as a camera for capturing an image of a portion to be inspected of the construction machine, wherein the captured image processing unit is configured to receive an image captured by the selected inspection camera to include the image of the portion to be inspected and cause the display unit to display the captured image.

DESCRIPTION OF EMBODIMENTS

Figure 1:
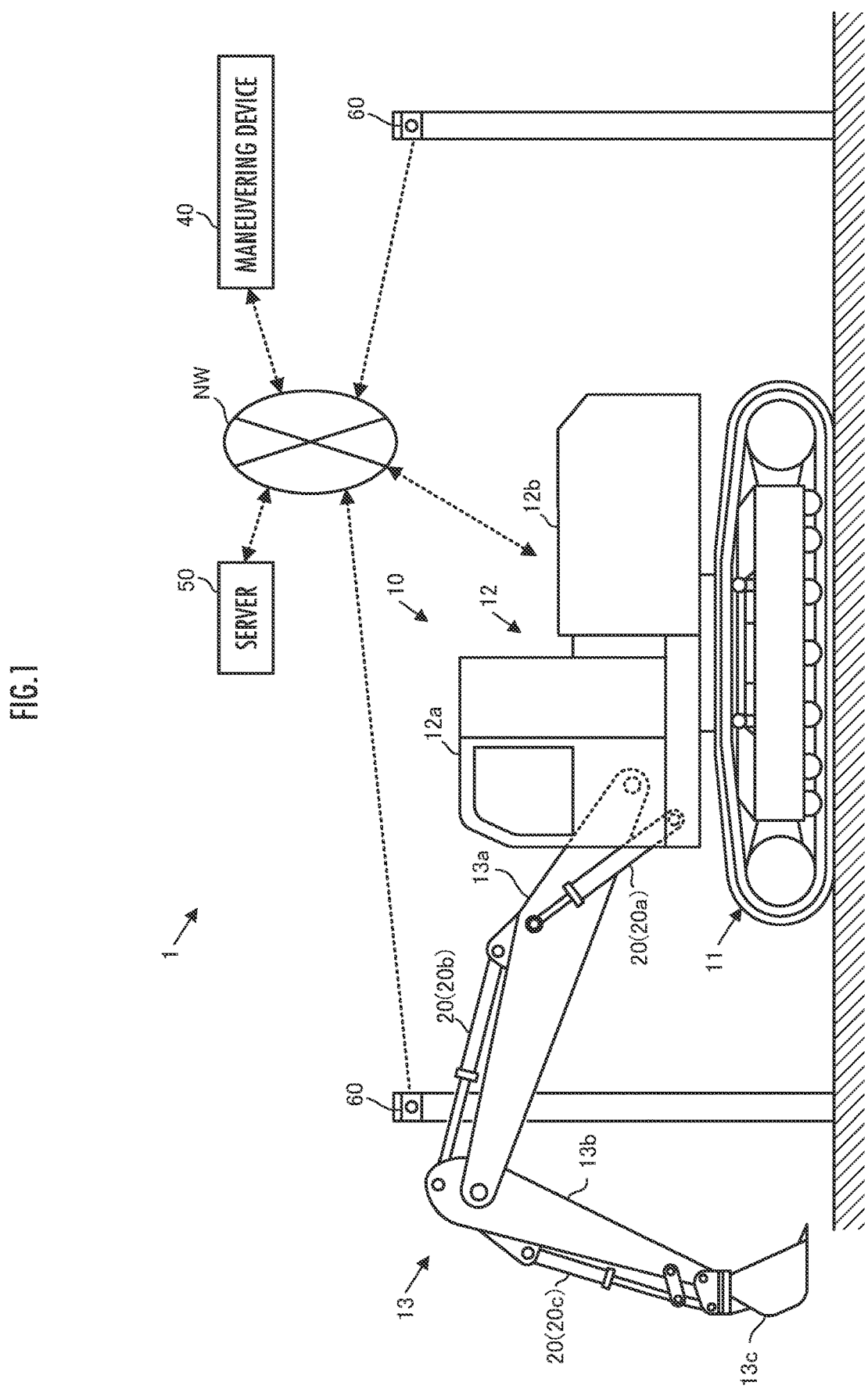
FIG. 1 is a diagram illustrating an overall configuration of a remote control system having a function as an inspection system of an embodiment of the present invention.

Hereinafter, an embodiment of the present invention will be described with reference to FIGS. 1 to 5. FIG. 1 illustrates an overall configuration of a remote control system 1 of a construction machine including a function as an inspection system of the present embodiment. The remote control system 1 is a system configured to allow an operator to remotely control a construction machine 10 by operating a maneuvering device 40, the construction machine 10 being allocated to the operator or the maneuvering device 40, as a construction machine to be controlled. Although FIG. 1 representatively illustrates only one of the construction machines 10 and only one of the maneuvering devices 40, the remote control system 1 may include a plurality of construction machines 10 and a plurality of maneuvering devices 40.

The remote control system 1 includes, in addition to the maneuvering devices 40 and the construction machines 10, a server 50 configured to perform various processing such as administration processing and information processing related to the remote control system 1, and a plurality of cameras 60 (hereinafter, referred to as on-site installed cameras 60) installed at a work site serving as a location environment where each construction machine 10 is to be located.

Each construction machine 10, each maneuvering device 40, and the server 50 can communicate with one another through a network NW including a wireless communication network. Each maneuvering device 40 and the server 50 can acquire, as appropriate, images captured by the on-site installed cameras 60 through the network NW. Each on-site installed camera 60 is configured to change, as appropriate, an image capturing direction (a direction of an optical axis) thereof and an image capturing magnification thereof according to an instruction from the maneuvering device 40 or the server 50.

As each construction machine 10, a hydraulic excavator may be adopted, for example. In this case, the construction machine 10 comprises a crawler type (or a wheel type) traveling body 11, a swivel body 12 swivelably mounted on the traveling body 11, and a work device 13 attached to a front portion of the swivel body 12, in the same manner as the well-known hydraulic excavator. The swivel body 12 has an operator cab 12*a* at a front portion thereof, and has a machine room 12*b* that houses an engine 22, a hydraulic circuit device 21, and the like, which will be described later, at a rear portion thereof. The work device 13 has a boom 13*a*, an arm 13*b*, and an attachment 13*c* (e.g., a bucket).

Figure 2:
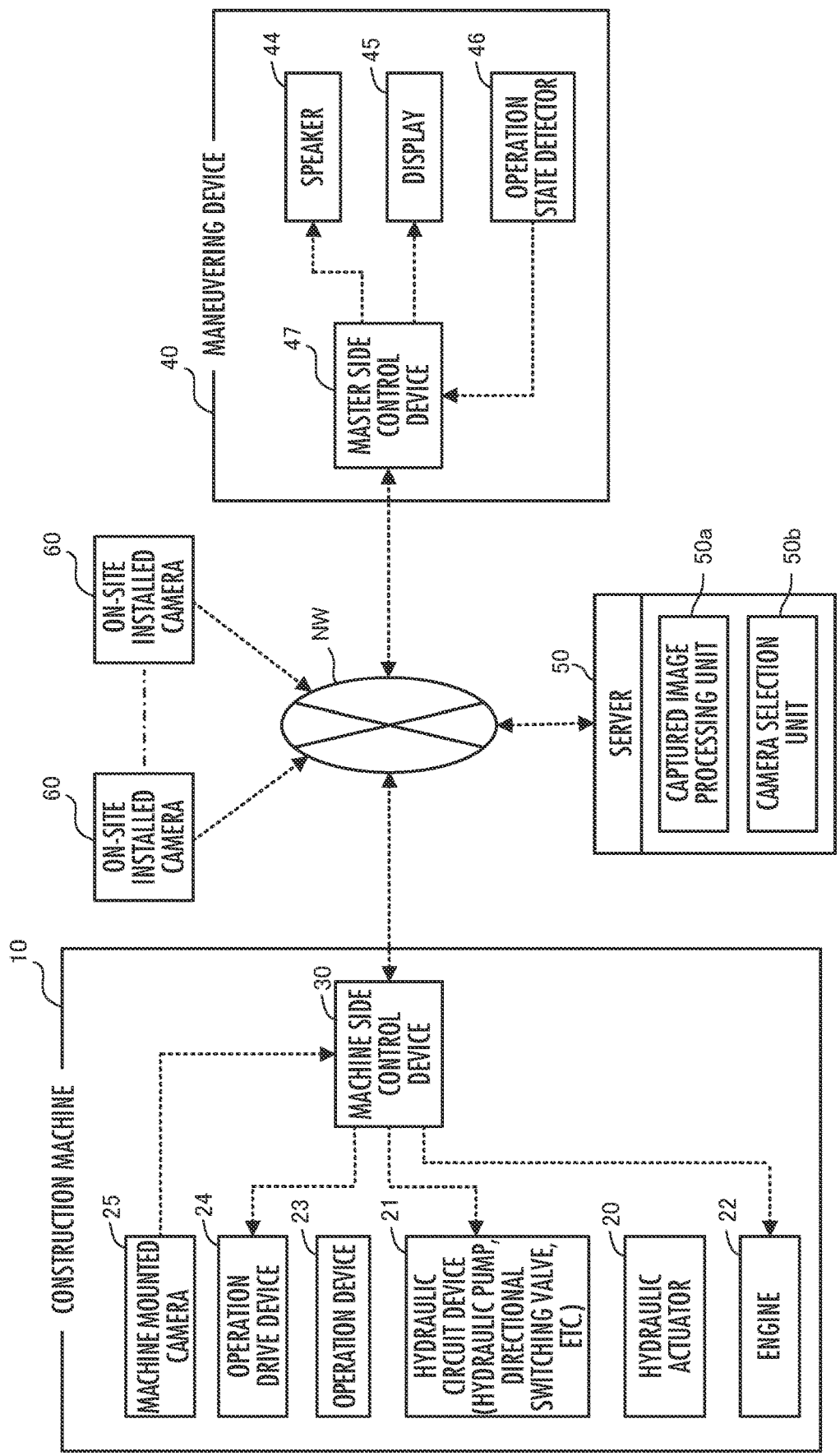
FIG. 2 is a block diagram illustrating a configuration related to control processing of the remote control system illustrated in FIG. 1.

Although not illustrated in detail, each construction machine 10 comprises, as illustrated in FIG. 2, a plurality of hydraulic actuators 20, the hydraulic circuit device 21 including a hydraulic pump, a directional switching valve, and the like, which are not illustrated, for supplying hydraulic oil to each hydraulic actuator 20, the engine 22 that drives the hydraulic pump of the hydraulic circuit device 21, an operation device 23 for operating an action of each hydraulic actuator 20, an electrically powered operation drive device 24 that drives the operation device 23, a plurality of cameras 25 (hereinafter, referred to as machine mounted cameras 25) mounted on the swivel body 12 and the like so as to capture images of conditions around the construction machine 10 (including the front side of the operator cab 12*a*), and a control device 30 (hereinafter, referred to as a machine side control device 30) having a function of performing the drive control of the construction machine 10. Note that FIG. 2 representatively illustrates only one of the hydraulic actuators 20 and only one of the machine mounted cameras 25.

The hydraulic actuators 20 include hydraulic cylinders 20*a*, 20*b*, and 20*c* (illustrated in FIG. 1) that drive the boom 13*a*, the arm 13*b* and the attachment 13*c* of the work device 13, respectively, and include a hydraulic motor for traveling (not illustrated) that performs traveling drive of the traveling body 11 and a hydraulic motor for swiveling (not illustrated) that performs swiveling drive of the swivel body 12.

The operation device 23 includes operation levers, operation pedals, operation switches, and the like which are located in the operator cab 12*a*. The operation drive device 24 has, for example, a plurality of electric motors, and is configured such that the operation levers or the operation pedals included in the operation device 23 can be driven by the electric motors via an appropriate power transmission mechanism.

The machine side control device 30 is composed of one or more electronic circuit units which include, for example, microcomputers, memories (RAM, ROM, and the like), interface circuits, wireless communication devices and the like. The machine side control device 30 has, as functions implemented by one or both of hardware configuration and a program (software configuration) which have been installed, a function of acquiring images captured by the machine mounted cameras 25, a function of communicating, through the network NW, with each of a master side control device 47, which will be described later, of the maneuvering device 40 and the server 50, and a function of performing the drive control of the construction machine 10 through the operation control of each of an electric valve (an electromagnetic proportional valve or the like) included in the hydraulic circuit device 21, the engine 22 and the operation drive device 24.

In this case, the machine side control device 30 communicates with the master side control device 47 or the server 50, which makes it possible to receive an actuation instruction of the construction machine 10 and transmit images captured by the machine mounted cameras 25 and information indicating an operation state of the construction machine 10 to the master side control device 47 or the server 50.

Figure 3:
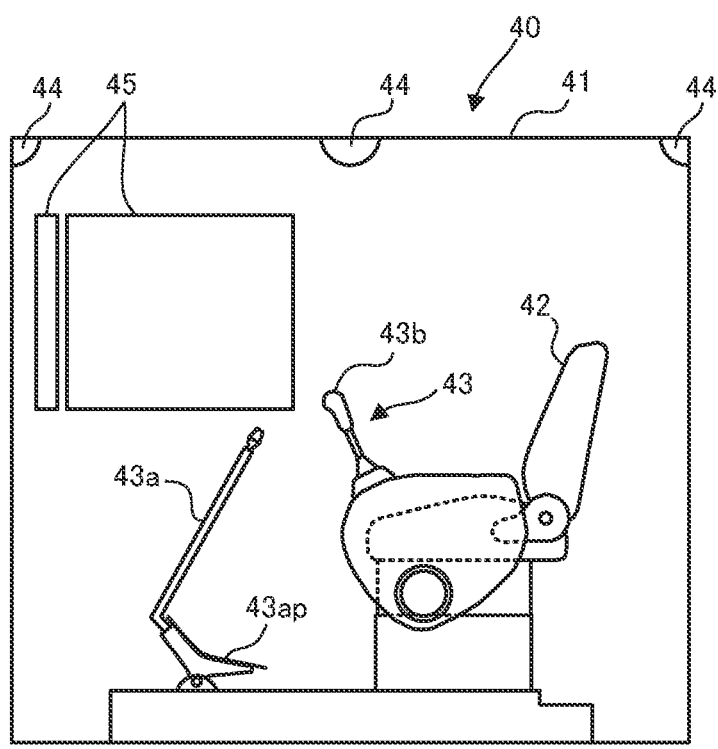
FIG. 3 is a diagram illustrating a configuration of a maneuvering device illustrated in FIG. 1.

As illustrated in FIG. 3, each maneuvering device 40 comprises, in a remote control room 41, a seat 42 on which an operator sits, an operation device 43 operated by the operator to perform remote control of the construction machine 10, speakers 44 as output devices of acoustic information (auditory information), and a display 45 as an output device of display information (visual information).

The operation device 43 can adopt a configuration which is the same as or similar to that of, for example, the operation device 23 of the construction machine 10. For example, the operation device 43 illustrated in FIG. 3 includes an operation lever 43*a* with an operation pedal 43*ap* located in front of the seat 42 and an operation lever 43*b* located on each of both left and right sides of the seat 42, so that an operator seated on the seat 42 can operate. However, the operation device 43 may have a different configuration from the operation device 23 of the construction machine 10. For example, the operation device 43 may be a portable operation device having a joystick, an operation button, or the like.

The speakers 44 are installed at a plurality of portions of the remote control room 41 (e.g., at the front, the rear, and both left and right sides of the remote control room 41). The display 45 is composed of, for example, a liquid crystal display, a head-up display, or the like, and is installed in the remote control room 41 such that the display 45 can be seen by an operator seated on the seat 42. In the present embodiment, the display 45 can function as a display unit in the present invention.

Furthermore, as illustrated in FIG. 2, the maneuvering device 40 further comprises an operation state detector 46 for detecting an operation state of the operation device 43, and the master side control device 47 having a function of executing control processing related to the maneuvering device 40. Note that the master side control device 47 may be located at either the inside or the outside of the remote control room 41.

The operation state detector 46 includes, for example, a potentiometer, a contact switch, and the like incorporated in the operation device 43, and is configured to output a detection signal indicating the operation state of each of the operation parts (the operation levers 43*a*, 43*b*, the operation pedal 43*ap*, and the like) of the operation device 43.

The master side control device 47 is composed of one or more electronic circuit units which include, for example, microcomputers, memories (RAM, ROM, and the like), interface circuits, communication devices and the like. The master side control device 47 has, as functions implemented by one or both of hardware configuration and a program (software configuration) which have been installed, a function of acquiring detection signals of the operation state detector 46, a function of acquiring, through the network NW, images captured by the on-site installed cameras 60 at work sites where the construction machines 10 to be controlled are located, a function of communicating, through the network NW, with each of the machine side control device 30 of each construction machine 10 to be controlled and the server 50, and a function of performing the operation control of the speakers 44 and the display control of the display 45.

In this case, the master side control device 47 communicates with the machine side control device 30 of the construction machine 10, which makes it possible to acquire, from the machine side control device 30, the images captured by the machine mounted cameras 25 of the construction machine 10 and the information indicating the operation state of the construction machine 10 and transmit, to the machine side control device 30, the actuation instruction of the construction machine 10 generated according to the operation state of the operation device 43. The master side control device 47 communicates with the server 50, which makes it possible to acquire, from the server 50, various information and instructions about the remote control of the construction machine 10.

The server 50 is composed of one or more electronic circuit units which include, for example, one or more computers, microcomputers, or the like, or a combination thereof. The server 50 has, as functions implemented by one or both of hardware configuration and a program (software configuration) which have been installed, a function of acquiring, through the network NW, images captured by each on-site installed camera 60, and a function of communicating, through the network NW, with each of the machine side control device 30 of each construction machine 10 and the master side control device 47 of each maneuvering device 40. Furthermore, the server 50 can also communicate with a communication terminal (e.g., a smartphone, a tablet terminal, a personal computer, or the like), which is not illustrated, which can be operated by an operator or the like of the maneuvering device 40.

The server 50 communicates with the machine side control device 30 of the construction machine 10, which makes it possible to acquire, from the machine side control device 30, the images captured by the machine mounted cameras 25 of the construction machine 10 and the information indicating the operation state of the construction machine 10.

The server 50 communicates with the master side control device 47 of the maneuvering device 40, which makes it possible to acquire, from the master side control device 47, the information indicating the operation state of the maneuvering device 40, and transmit various information and instructions about the remote control or inspection of the construction machine 10 to the master side control device 47 of the maneuvering device 40 which can control the construction machine 10.

The server 50 stores therein information indicating operation schedules and operation histories of each of the construction machines 10 and the maneuvering devices 40, and stores therein positional information of each on-site installed camera 60 (information indicating the position of each on-site installed camera 60 as observed in a global coordinate system) or positional information of an image capturable region of each on-site installed camera 60 (information indicating the position of an image capturable range of each on-site installed camera 60 as observed in a global coordinate system). The positional information of each on-site installed camera 60 may include information indicating a direction of an optical axis of each on-site installed camera 60 or a variable range thereof. The positional information of each on-site installed camera 60 or the image capturable range thereof may be stored in a memory provided in each on-site installed camera 60 so that the server 50 can acquire the positional information from each on-site installed camera 60 as appropriate.

Furthermore, the server 50 may acquire, as appropriate, the positional information of each construction machine 10 (information indicating the position of the construction machine 10 as observed in a global coordinate system) using a global navigation satellites system (GNSS), the images captured by the on-site installed cameras 60 at the work site where each construction machine 10 is located or the images captured by the machine mounted cameras 25 of the other construction machines 10 present in the periphery of each construction machine 10. The positional information of the construction machine 10 may include information indicating an orientation of the traveling body 11 or the swivel body 12 of the construction machine 10.

The server 50 stores therein, for each model of the construction machine 10, the positional information of a plurality of portions to be inspected which are predetermined as portions where an inspection based on the appearance is to be performed as appropriate for the construction machine 10 of each model (information indicating the positions as observed in a local coordinate system set for the construction machine 10), and the positional information of each machine mounted camera 25 of the construction machine 10 of each model (information indicating the positions as observed in a local coordinate system set for the construction machine 10) or the positional information of the image capturable range of each machine mounted camera 25 (information indicating the positions as observed in a local coordinate system set for the construction machine 10). The positional information of each machine mounted camera 25 may include information indicating a direction of an optical axis of the camera 25.

Supplementally, the positional information of each portion to be inspected of the construction machine 10 and the positional information of each machine mounted camera 25 of the construction machine 10 or the image capturable range thereof are stored in the machine side control device 30 of the construction machine 10, so that the server 50 can acquire these pieces of positional information from the machine side control device 30 as appropriate.

The server 50 includes a function as a captured image processing unit 50a configured to cause the display 45 of the maneuvering device 40 to display an image captured for an inspection or the like and a function as a camera selection unit 50b configured to select inspection cameras for capturing images to be captured for the inspection from the machine mounted cameras 25 of the construction machine 10 and the on-site installed cameras 60 at the work site where the construction machine 10 is to be located, in cooperation with the master side control device 47 of the maneuvering device 40, to perform processing on inspections of a plurality of portions to be inspected of the construction machine 10. In this case, in the case where the construction machine 10 is shown in images captured by the on-site installed cameras 60 or the machine mounted cameras 25, the captured image processing unit 50a includes a function of identifying an image part of each portion to be inspected of the construction machine 10 captured in the captured image and a function of determining the state of the portion to be inspected from the images captured from the inspection cameras (determine whether the portion to be inspected is in a normal state or has any abnormality). Supplementally, in the present embodiment, the master side control device 47 of the maneuvering device 40 includes part of the function of the captured image processing unit in the present invention.

Next, an inspection work of each construction machine 10 will be described. When intending to perform an inspection, an inspection worker who performs the inspection (inspection based on the appearance) of each construction machine 10 reports the fact to the server 50 by performing a predetermined operation on the maneuvering device 40 or a predetermined operation on the communication terminal operable by the inspection worker. Accordingly, the server 50 starts the processing related to the inspection of the construction machine 10.

Alternatively, the server 50 starts the processing related to the inspection of the construction machine 10 when the inspection worker activates the maneuvering device 40 which can control the construction machine 10 to be inspected at a timing when a predetermined inspection start condition is established on the basis of the operation schedule or operation history of each construction machine 10 (e.g., a timing before start of work by the construction machine 10, a timing after completion of work by the construction machine 10, a timing in the vicinity of a time point when cumulative operational time of the construction machine 10 has reached a predetermined time, or the like). Note that the above-described inspection worker is not limited to an operator who controls the construction machine 10, and may be a worker other than the operator.

At this time, the server 50 sequentially selects each of a plurality of portions to be inspected of the construction machine 10 to be inspected, in response to the operation on the maneuvering device 40 (or the operation on the communication terminal) by the inspection worker. Alternatively, the server 50 sequentially selects each of a plurality of portions to be inspected of the construction machine 10 in a predetermined order. Then, the server 50 causes the camera selection unit 50*b* to execute the processing of selecting, as inspection cameras for capturing images of a portion to be inspected which is selected for the construction machine 10 to be inspected (hereinafter, simply referred to as the selected portion to be inspected), any of a plurality of on-site installed cameras 60 at the work site where the construction machine 10 to be inspected is located, a plurality of machine mounted cameras 25 of the construction machine 10 to be inspected, and the machine mounted cameras 25 of the other construction machines 10 which are present in the periphery of the construction machine 10 to be inspected. Note that in the present embodiment, a plurality of on-site installed cameras 60 at the work site (location environment) where the construction machine 10 to be inspected is located and the machine mounted cameras 25 of the other construction machines 10 which are present in the periphery of the construction machine 10 to be inspected correspond to external cameras in the present invention.

Specifically, the processing of the camera selection unit 50*b* is executed as follows. That is, the camera selection unit 50*b* identifies the positional relationship between each on-site installed camera 60 and the selected portion to be inspected on the basis of the positional information of each on-site installed camera 60 at the work site where the construction machine 10 to be inspected is located or the image capturable range thereof, the positional information of the construction machine 10 to be inspected, and the positional information of the selected portion to be inspected of the construction machine 10, or on the basis of these pieces of positional information and the detection information about the postures of both or one of the swivel body 12 and the work device 13 of the construction machine 10 to be inspected.

In this case, the positional relationship to be identified includes, for example, a distance between each on-site installed camera 60 and the selected portion to be inspected, an orientation of the selected portion to be inspected with respect to each on-site installed camera 60, and the information on whether the selected portion to be inspected is present in the image capturable range of each on-site installed camera 60.

As the detection information about the posture of the swivel body 12 of the construction machine 10, for example, a detection value of a swivel angle of the swivel body 12 and a detection value of an inclination angle of the swivel body 12 are used, and as the detection information about the posture of the work device 13, for example, detection values of swing angles of the boom 13*a*, the arm 13*b*, and the attachment 13*c* are used. Then, the server 50 acquires these pieces of detection information via the machine side control device 30 of the construction machine 10 to be inspected.

The camera selection unit 50*b* identifies the positional relationship between each machine mounted camera 25 of the construction machine 10 to be inspected and the selected portion to be inspected on the basis of the positional information of each machine mounted camera 25 in the construction machine 10 to be inspected or the image capturable range thereof, and the positional information of the selected portion to be inspected of the construction machine 10 to be inspected, or on the basis of these pieces of positional information and the detection information about the postures of both or one of the swivel body 12 and the work device 13 of the construction machine 10 to be inspected.

In this case, the positional relationship to be identified includes, for example, a distance between each machine mounted camera 25 and the selected portion to be inspected of the construction machine 10 to be inspected, an orientation of the selected portion to be inspected with respect to each machine mounted camera 25, and the information on whether the selected portion to be inspected is present in the image capturable range of each machine mounted camera 25. Note that the detection information about the posture of each of the swivel body 12 and the work device 13 of the construction machine 10 to be inspected can be acquired in the same manner as in the case where the positional relationship between each on-site installed camera 60 and the selected portion to be inspected is identified.

The camera selection unit 50*b* identifies the positional relationship between each machine mounted camera 25 of the other construction machines 10 which are present in the periphery of the construction machine 10 to be inspected and the selected portion to be inspected of the construction machine 10 to be inspected on the basis of the positional information of the above-described other construction machines 10, the positional information of each machine mounted camera 25 in the other construction machines 10 or the image capturable range thereof, the positional information of the construction machine 10 to be inspected, and the positional information of the selected portion to be inspected of the construction machine 10 to be inspected, or on the basis of these pieces of positional information, the detection information about the postures of both or one of the swivel body 12 and the work device 13 of each of the above-described other construction machines 10, and the detection information about the postures of both or one of the swivel body 12 and the work device 13 of the construction machine 10 to be inspected.

In this case, the positional relationship to be identified includes, for example, a distance between each machine mounted camera 25 of the above-described other construction machines 10 and the selected portion to be inspected of the construction machine 10 to be inspected, an orientation of the selected portion to be inspected of the construction machine 10 to be inspected with respect to each machine mounted camera 25 of the above-described other construction machines 10, and the information on whether the selected portion to be inspected is present in the image capturable range of each machine mounted camera 25 of the above-described other construction machines 10. Note that the detection information about the posture of each of the swivel body 12 and the work device 13 of the construction machine 10 to be inspected can be acquired in the same manner as in the case where the positional relationship between each on-site installed camera 60 and the selected portion to be inspected is identified. The same applies to the detection information about the posture of each of the swivel body 12 and the work device 13 of each of the other construction machines 10 which are present in the periphery of the construction machine 10 to be inspected.

As described above, the camera selection unit 50b identifies the positional relationship between the selected portion to be inspected of the construction machine 10 to be inspected and each of each on-site installed camera 60 at the work site where the construction machine 10 to be inspected is located, each machine mounted camera 25 of the construction machine 10 to be inspected, and each machine mounted camera 25 of the other construction machines 10 which are present in the periphery of the construction machine 10 to be inspected.

Then, the camera selection unit 50b extracts, as candidates of the inspection cameras (hereinafter, referred to inspection camera candidates), the cameras which can capture images of the selected portion to be inspected (cameras whose image capturable ranges include the selected portion to be inspected) on the basis of results of identification of the positional relationships. Furthermore, the camera selection unit 50b acquires images captured by each of the inspection camera candidates (captured images including the selected portion to be inspected of the image capturable range). In this case, in the case where the inspection camera candidate is configured to change a direction of an optical axis thereof, the camera selection unit 50b adjusts the orientation of the inspection camera candidate so that the direction of the optical axis is made close to the selected portion to be inspected as much as possible within a variable range of the optical axis and then the camera selection unit 50b acquires an image captured by the inspection camera candidate.

Then, the camera selection unit 50b determines whether an image of the selected portion to be inspected can be recognized from images captured by the inspection camera candidates by the image recognition processing with respect to the captured images, and determines, as an inspection camera with respect to the selected portion to be inspected, the inspection camera candidate where the determination result is obtained as affirmative. In this case, in the case where there are a plurality of inspection camera candidates from which the server 50 can acquire the recognizable image of the selected portion to be inspected, the plurality of inspection camera candidates are determined as the inspection cameras.

Figure 4:
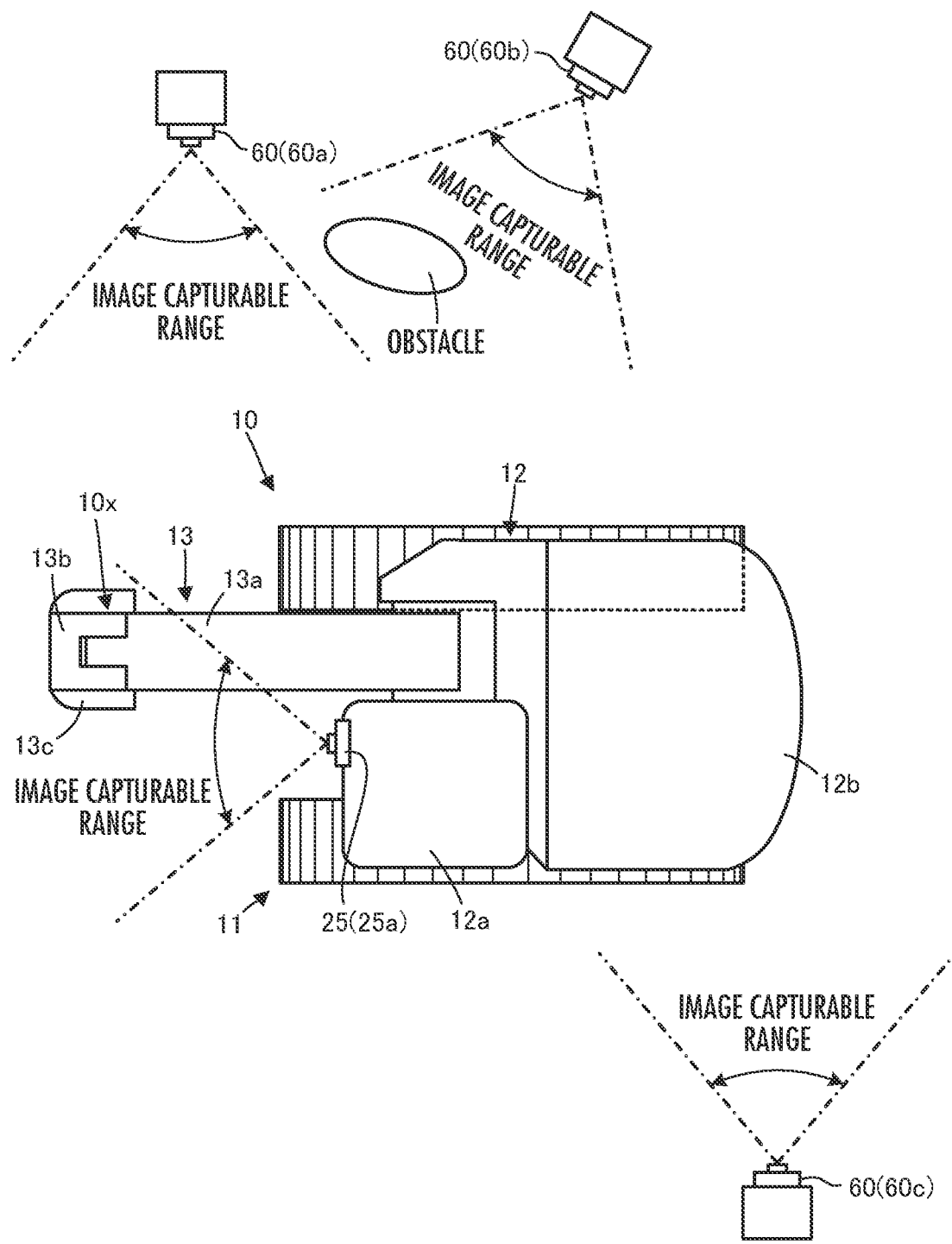
FIG. 4 is an explanatory diagram related to selection processing of an inspection camera.

For example, in the situation illustrated in FIG. 4, it is assumed that a connection portion between the boom 13a and the arm 13b of the construction machine 10 to be inspected is a selected portion 10x to be inspected. Here, three on-site installed cameras 60 (60a, 60b, and 60c) are installed at the work site of the construction machine 10 to be inspected, and there are no other construction machines 10 in the periphery of the construction machine 10 to be inspected. In FIG. 4, only the machine mounted camera 25a which is mounted, for example, on a ceiling part of the operator cab 12a so as to capture an image of the front side is representatively illustrated as the machine mounted camera 25 of the construction machine 10.

In this case, among the on-site installed cameras 60 (60a, 60b, and 60c) at the work site of the construction machine 10, the selected portion 10x to be inspected is included in the image capturable range of each of the on-site installed cameras 60a and 60b, whereas the selected portion 10x to be inspected is not included in the image capturable range of the on-site installed camera 60c. The image of the selected portion 10x to be inspected is shown in the image captured by the on-site installed camera 60a, but since an obstacle is present between the on-site installed camera 60b and the selected portion 10x to be inspected, the image of the selected portion 10x to be inspected is not shown in the image captured by the on-site installed camera 60b.

In addition, among the machine mounted camera 25 of the construction machine 10, the selected portion 10x to be inspected is present in the image capturable range of the machine mounted camera 25a but the selected portion 10x to be inspected is not included in the image capturable range of the other machine mounted cameras 25 (not illustrated). Then, the image of the selected portion 10x to be inspected is shown in the image captured by the machine mounted camera 25a.

In such a situation, the on-site installed cameras 60a and 60b and the machine mounted camera 25a are extracted as the inspection camera candidates, and furthermore the on-site installed camera 60a and the machine mounted camera 25a are selected as the inspection cameras.

As described above, the camera selection unit 50b determines the inspection cameras, whereby one or a plurality of cameras which can appropriately capture proper (clear) images of the selected portion to be inspected are selected, as the inspection cameras, from among the on-site installed cameras 60 at the work site where the construction machine 10 to be inspected is located, the machine mounted cameras 25 of the construction machine 10, and the machine mounted cameras 25 of the other construction machines 10 which are present in the periphery of the construction machine 10. Therefore, not only the camera whose image capturable range does not include the selected portion to be inspected but also the camera which cannot capture properly the image of the selected portion to be inspected due to an obstacle, contamination of lens of the camera, or the like can be prevented from being selected as the inspection cameras.

Supplementally, in the case where there are a plurality of inspection camera candidates which can capture the proper (clear) images of the selected portion to be inspected, the inspection camera candidates may be selected as the inspection cameras from among the plurality of inspection camera candidates, the inspection camera candidates being closest in distance from the selected portion to be inspected or being located so that the closest distance is within a predetermined distance, for example. For example, in the situation illustrated in FIG. 4, only the machine mounted camera 25a may be selected as the inspection camera.

Alternatively, for example, the inspection camera candidate in which the deviation of the optical axis direction with respect to the front direction of the selected portion to be inspected is minimized or is within a predetermined range may be selected, as the inspection camera, from among the plurality of inspection camera candidates which can capture the proper (clear) images of the selected portion to be inspected.

For example, in the situation illustrated in FIG. 4, only the on-site installed camera 60a may be selected as the inspection camera.

After selecting the inspection cameras using the camera selection unit 50b as described above, the server 50 executes the processing of the captured image processing unit 50a. The captured image processing unit 50a transmits the image captured by the inspection camera to the master side control device 47 for the construction machine 10 to be inspected and instructs the master side control device 47 to display the transmitted captured image on the display 45.

Figure 5:
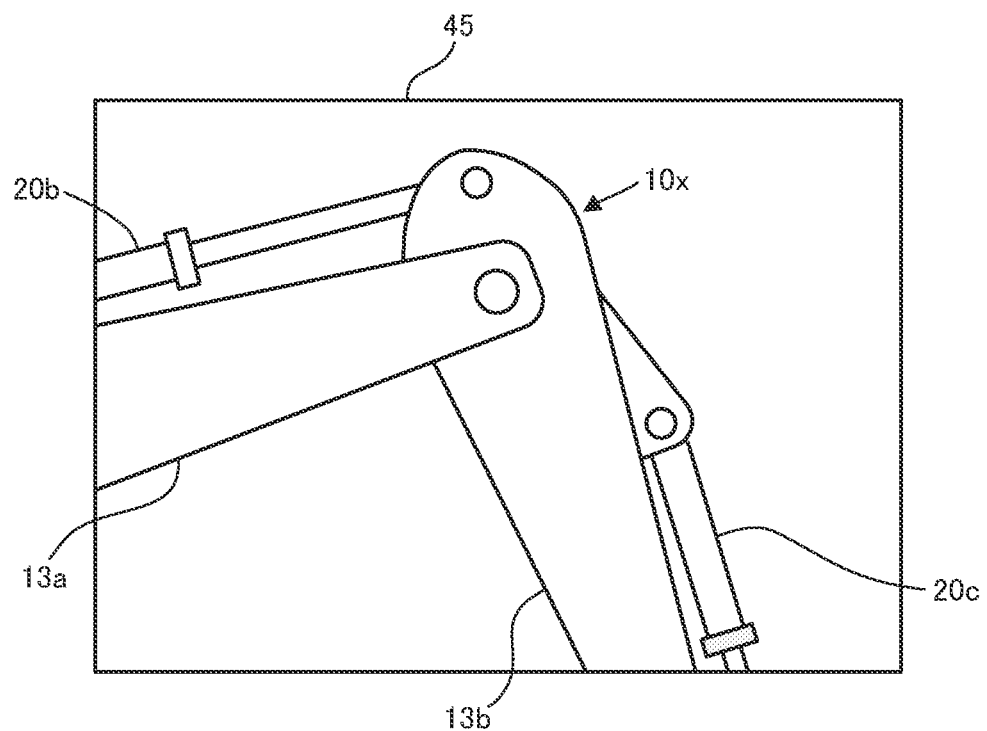
FIG. 5 is a diagram illustrating an image captured by the inspection camera.

Accordingly, the master side control device 47 causes the image captured by the inspection camera to be displayed on the display 45. In this case, in the case where there are a plurality of inspection cameras, the images captured by each inspection camera can be selectively displayed on the display 45 in response to the predetermined operation on the maneuvering device 40 by the inspection worker. For example, in the situation illustrated in FIG. 4, the image captured by the on-site installed camera 60 as the inspection camera is displayed on the display 45 as illustrated in FIG. 5.

In the case where the inspection camera is adjustable in the image capturing magnification and the image capturing direction (optical axis direction), the inspection worker can also instruct the server 50 to adjust the image capturing magnification and the image capturing direction of the inspection camera by performing a predetermined operation on the maneuvering device 40 or an operation on the communication terminal (not illustrated). At this time, the server 50 controls the image capturing magnification and the image capturing direction of the inspection camera according to the instruction by the inspection worker.

Supplementally, for example, in the case where the server 50 is configured to perform automatic control of the construction machine 10 to be inspected, the captured image processing unit 50a of the server 50 may cause the traveling body 11 of the construction machine 10 to perform a traveling operation and cause the swivel body 12 of the construction machine 10 to perform a swiveling operation so as to adjust the orientation of the construction machine 10 with respect to the inspection camera in response to a request from the inspection worker (a request in response to the operation on the maneuvering device 40 or the communication terminal) Alternatively, the master side control device 47 of the maneuvering device 40 may cause the traveling body 11 of the construction machine 10 to perform a traveling operation and cause the swivel body 12 of the construction machine 10 to perform a swiveling operation so as to adjust the orientation of the construction machine 10 with respect to the inspection camera in response to a request from the inspection worker (a request in response to the operation on the maneuvering device 40 or the communication terminal).

The captured image processing unit 50a of the server 50 determines whether the selected portion to be inspected is in the normal state, on the basis of the pre-learning from the images captured by the inspection cameras. For example, a learned model is created by pre-learning the images of each portion to be inspected of the construction machine 10 when the portion to be inspected is in the normal state, and it is determined whether the selected portion to be inspected is in the normal state on the basis of the created learned model. Then, the information indicating the determination result is transmitted to the master side control device 47. At this time, the master side control device 47 causes the information indicating the determination result to be displayed together with the image captured by the inspection camera on the display 45 or to be output from the speakers 44 by sound or voice.

The inspection worker checks whether there is an abnormality such as cracks or oil leakage in the selected portion to be inspected on the basis of the image captured by the inspection camera which is displayed on the display 45 as described above. At this time, the inspection worker can recognize, by the display on the display 45 or the sound or voice output from the speakers 44, the result of determination by the captured image processing unit 50a of the server 50, and can check the determination result against the result of determination by the inspection worker.

This enables the inspection worker to carefully determine the presence or absence of an abnormality in the selected portion to be inspected, and furthermore to perform highly reliable determination. In particular, in the case where the result of determination by the server 50 is displayed together with the image captured by the inspection camera on the display 45, the inspection worker can carefully and visually recognize the image of the selected portion to be inspected while visually recognizing the result of determination by the server 50, which makes it possible to effectively increase the reliability of the result of determination by the inspection worker as to whether there is an abnormality.

Then, the result of determination by the inspection worker as to whether there is abnormality in the selected portion to be inspected is transmitted to the server 50 in response to an operation on the maneuvering device 40 or an operation on the communication terminal by the inspector worker, and is stored in the server 50. In the present embodiment, the inspection based on the appearance as described above is sequentially performed for each of a plurality of portions to be inspected of the construction machine 10 to be inspected. Note that the result of determination as to whether there is an abnormality in each of the plurality of portions to be inspected of the construction machine 10 is reported from the server 50 to a manager or the like of the construction machine 10. Alternatively, the inspection worker reports the determination result to the manager or the like of the construction machine 10 via the communication terminal According to the embodiment described above, the on-site installed cameras 60 at the work site of the construction machine 10 to be inspected or the machine mounted cameras 25 of the other construction machines 10 which are present in the periphery of the construction machine 10 to be inspected or the machine mounted cameras 25 of the construction machine 10 to be inspected can be used as the inspection cameras. Therefore, the inspection worker can view a proper captured image of each of the plurality of portions to be inspected of the construction machine 10 at a place away from the construction machine 10 without the need to perform work of attaching the inspection camera to the construction machine 10. Therefore, the inspection based on the appearance of each of the plurality of portions to be inspected of the construction machine 10 can be effectively performed at a place away from the construction machine 10.

In addition, since the inspection worker can adjust the magnification of the image captured by the inspection camera and the image capturing direction of the inspection camera, the inspection worker can view the captured image which makes it possible to easily check whether there is an abnormality in the portion to be inspected. This can increase the reliability of the result of determination by the inspection worker as to whether there is an abnormality. In addition, since the inspection worker can know the result of determination by the server 50, the inspection worker can carefully determine whether there is an abnormality in the portion to be inspected, and furthermore the reliability of the result of determination by the inspection worker can be further increased.

Note that the present invention is not limited to the above-described embodiment, but can adopt other embodiments. Several other embodiments will be described below. In the above-described embodiment, the server 50 has the functions of the captured image processing unit 50a and the camera selection unit 50b, but the master side control device 47 of the maneuvering device 40 or the communication terminal operable by the inspection worker may have the entirety or part of the functions of the captured image processing unit 50a and the camera selection unit 50b.

In the above-described embodiment, the display 45 of the maneuvering device 40 is used as a display unit for displaying the image captured by the inspection camera, but the display unit may be a display unit of the communication terminal operable by the inspection worker, for example.

In the above-described embodiment, the on-site installed cameras 60 and the machine mounted cameras 25 of the other construction machines 10 which are present in the periphery of the construction machine 10 to be inspected are used as external cameras in the present invention, but the external cameras may include cameras to be mounted on an aerial vehicle such as a drone which can fly at the work site, for example In the above-described embodiment, the camera which can capture an image of the selected portion to be inspected is selected as the inspection camera from among the inspection camera candidates extracted on the basis of the positional relationship between the selected portion to be inspected of the construction machine 10 to be inspected and each of each on-site installed camera 60 at the work site where the construction machine 10 to be inspected is located, each machine mounted camera 25 of the construction machine 10, and each machine mounted camera 25 of the other construction machines 10 which are present in the periphery of the construction machine 10.

However, for example, each camera whose image capturable range may be determined to include the selected portion to be inspected on the basis of the above-described positional relationship may be selected as the inspection camera. Alternatively, for example, images captured by each of each on-site installed camera 60 at the work site where the construction machine 10 to be inspected is located, each machine mounted camera 25 of the construction machine 10 to be inspected, and each machine mounted camera 25 of the other construction machine 10 which are present in the periphery of the construction machine 10 to be inspected is acquired, and the image recognition processing of recognizing an image of the selected portion to be inspected is performed with respect to the captured images, such that the camera which shows the image of the selected portion to be inspected may be selected as the inspection camera.

In the above-described embodiment, a hydraulic excavator is exemplified as the construction machine 10, but the construction machine in the present invention is not limited to the hydraulic excavator, and may be, for example, a construction machine such as a crane.

As described above, an inspection system for a construction machine of the present invention comprises:

a plurality of cameras which are located in a location environment of a construction machine so as to capture images of appearance of the construction machine;

a captured image processing unit which is located outside of the construction machine so as to receive images captured by each of the plurality of cameras and comprises a display unit configured to display the received captured images; and a camera selection unit configured to select an inspection camera from the plurality of cameras at a time of inspection of the construction machine, the inspection camera serving as a camera for capturing an image of a portion to be inspected of the construction machine, wherein the captured image processing unit is configured to receive an image captured by the selected inspection camera to include the image of the portion to be inspected and cause the display unit to display the captured image (first invention).

According to the first invention, the inspection camera suitable for capturing the image of the portion to be inspected can be selected from among the plurality of cameras in the location environment where the construction machine is located, and the image captured by the inspection camera (captured image including the image of the portion to be inspected) can be displayed on the display unit outside of the construction machine. Therefore, the inspection worker can visually check the state of the portion to be inspected from the display information of the display unit. Accordingly, the inspection work of the construction machine can be appropriately performed from the remote place without the need for the work of attaching the inspection camera to the construction machine at the time of inspection of the construction machine In the above-described first invention, the plurality of cameras preferably include an external camera which is a camera located outside of the construction machine, and a machine mounted camera which is a camera previously mounted on the construction machine (second invention).

Thus, since the plurality of cameras include the machine mounted camera in addition to the external camera, the inspection camera suitable for capturing the image including the image of the portion to be inspected can be selected for various portions to be inspected of the construction machine.

In the above-described first and second inventions, in the case where there are a plurality of portions to be inspected of the construction machine, the camera selection unit is preferably configured to select the inspection camera for each of the plurality of portions to be inspected (third invention).

Thus, the inspection camera suitable for capturing a captured image including an image of each portion to be inspected can be selected for each of the plurality of portions to be inspected.

In the above-described first to third inventions, the camera selection unit may be configured to acquire first information indicating a positional relationship between the construction machine and each of the plurality of cameras or a positional relationship between the construction machine and an image capturable region of each of the plurality of cameras and second information indicating a position of the portion to be inspected of the construction machine, and select the inspection camera on the basis of at least the first information and the second information (fourth invention).

Thus, the inspection camera which can capture a captured image including the image of the portion to be inspected can be properly selected by selecting the inspection camera on the basis of the first information and second information.

In the above-described first to fourth inventions, the camera selection unit may be configured to acquire the images captured by each of the plurality of cameras, perform image recognition processing of recognizing the image of the portion to be inspected from the captured images, and select the inspection camera on the basis of at least results of the image recognition processing (fifth invention).

Thus, the camera which can actually capture a proper image of the portion to be inspected can be selected as the inspection camera from among the plurality of cameras by selecting the inspection camera on the basis of the results of the image recognition processing. For example, the camera which cannot capture clearly the image of the portion to be inspected due to contamination of lens, an obstacle, or the like can be prevented from being selected as the inspection camera.

In the above-described first to fifth inventions, the captured image processing unit is preferably configured to further have a function of changing at least one of an image capturing direction of the inspection camera, an image capturing magnification of the inspection camera, and an orientation of the construction machine, when acquiring the image captured by the inspection camera (sixth invention).

Thus, an image suitable for checking the state of the portion to be inspected can be included in the image captured by the inspection camera (e.g., a front image of the portion to be inspected can be shown in the vicinity of the center of the captured image or an image of the portion to be inspected can have an easily viewable size).

In the above-described first to sixth inventions, the captured image processing unit may further include a function of determining the state of the portion to be inspected on the basis of the captured image captured by the inspection camera to include the image of the portion to be inspected and a function of reporting information indicating a result of the determination to an inspection worker who visually recognizes the display unit at a time of inspection of the construction machine (seventh invention).

Thus, the inspection worker can check the state of the portion to be inspected from the image of the portion to be inspected in the image captured by the inspection camera which is displayed on the display unit and can know the result of the determination, which makes it possible to prevent the inspection worker from erroneously identifying the state of the portion to be inspected.

In the above-described seventh invention, the captured image processing unit may be configured to cause the display unit to display the captured image captured by the inspection camera to include the image of the portion to be inspected and at the same time, cause the display unit to display the information indicating the result of the determination (eighth invention).

Thus, since the inspection worker can recognize the result of the determination while checking the state of the portion to be inspected from the image of the portion to be inspected in the image captured by the inspection camera which is displayed on the display unit, the inspection worker can effectively check the state of the portion to be inspected on the basis of the image.

In the above-described first to eighth inventions, the camera selection unit and the captured image processing unit may each be configured to start respective processing in response to establishment of a predetermined inspection start condition (ninth invention). Thus, the inspection of the construction machine can be performed at an appropriate timing

The invention claimed is:

1. An inspection system for a construction machine, comprising:
   a plurality of cameras which are located in a location environment of a construction machine so as to capture images of appearance of the construction machine;
   a captured image processing unit which is located outside of the construction machine so as to receive images captured by each of the plurality of cameras and comprises a display unit configured to display the received captured images; and
   a camera selection unit configured to select an inspection camera from the plurality of cameras at a time of inspection of the construction machine, the inspection camera serving as a camera for capturing an image of a portion to be inspected of the construction machine,
   wherein the captured image processing unit is configured to receive an image captured by the selected inspection camera to include the image of the portion to be inspected and cause the display unit to display the captured image, and
   the camera selection unit is configured to acquire first information indicating a positional relationship between the construction machine and each of the plurality of cameras or a positional relationship between the construction machine and an image capturable region of each of the plurality of cameras and second information indicating a position of the portion to be inspected of the construction machine, and select the inspection camera on a basis of at least the first information and the second information.

2. The inspection system for the construction machine according to claim 1, wherein the plurality of cameras include an external camera which is a camera located outside of the construction machine, and a machine mounted camera which is a camera previously mounted on the construction machine.

3. The inspection system for the construction machine according to claim 1, wherein there are a plurality of portions to be inspected of the construction machine, and the camera selection unit is configured to select the inspection camera for each of the plurality of portions to be inspected.

4. The inspection system for the construction machine according to claim 1, wherein the camera selection unit is configured to acquire the images captured by each of the plurality of cameras, perform image recognition processing of recognizing the image of the portion to be inspected from each of the captured images, and select the inspection camera on a basis of at least results of the image recognition processing.

5. The inspection system for the construction machine according to claim 1, wherein the captured image processing unit is configured to further have a function of changing at least one of an image capturing direction of the inspection camera, an image capturing magnification of the inspection camera, and an orientation of the construction machine, when acquiring the image captured by the inspection camera.

6. The inspection system for the construction machine according to claim 1, wherein the captured image processing unit further includes a function of determining a state of the portion to be inspected on a basis of the captured image captured by the inspection camera to include the image of the portion to be inspected and a function of reporting information indicating a result of the determination to an inspection worker who visually recognizes the display unit at a time of inspection of the construction machine.

7. The inspection system for the construction machine according to claim 6, wherein the captured image processing unit is configured to cause the display unit to display the captured image captured by the inspection camera to include the image of the portion to be inspected and at a same time, cause the display unit to display the information indicating the result of the determination.

8. The inspection system for the construction machine according to claim 1, wherein the camera selection unit and the captured image processing unit are each configured to start respective processing in response to establishment of a predetermined inspection start condition.

9. An inspection system for a construction machine, comprising:
- a plurality of cameras which are located in a location environment of a construction machine so as to capture images of appearance of the construction machine;
- a captured image processing unit which is located outside of the construction machine so as to receive images captured by each of the plurality of cameras and comprises a display unit configured to display the received captured images; and
- a camera selection unit configured to select an inspection camera from the plurality of cameras at a time of inspection of the construction machine, the inspection camera serving as a camera for capturing an image of a portion to be inspected of the construction machine,
- wherein the captured image processing unit is configured to receive an image captured by the selected inspection camera to include the image of the portion to be inspected and cause the display unit to display the captured image, and
- wherein the camera selection unit is configured to acquire the images captured by each of the plurality of cameras, perform image recognition processing of recognizing the image of the portion to be inspected from each of the captured images, and select the inspection camera on a basis of at least results of the image recognition processing.

10. The inspection system for the construction machine according to claim 9, wherein the plurality of cameras include an external camera which is a camera located outside of the construction machine, and a machine mounted camera which is a camera previously mounted on the construction machine.

11. The inspection system for the construction machine according to claim 9, wherein there are a plurality of portions to be inspected of the construction machine, and the camera selection unit is configured to select the inspection camera for each of the plurality of portions to be inspected.

12. The inspection system for the construction machine according to claim 9, wherein the captured image processing unit is configured to further have a function of changing at least one of an image capturing direction of the inspection camera, an image capturing magnification of the inspection camera, and an orientation of the construction machine, when acquiring the image captured by the inspection camera.

13. The inspection system for the construction machine according to claim 9, wherein the captured image processing unit further includes a function of determining a state of the portion to be inspected on a basis of the captured image captured by the inspection camera to include the image of the portion to be inspected and a function of reporting information indicating a result of the determination to an inspection worker who visually recognizes the display unit at a time of inspection of the construction machine.

14. The inspection system for the construction machine according to claim 13, wherein the captured image processing unit is configured to cause the display unit to display the captured image captured by the inspection camera to include the image of the portion to be inspected and at a same time, cause the display unit to display the information indicating the result of the determination.

15. The inspection system for the construction machine according to claim 9, wherein the camera selection unit and the captured image processing unit are each configured to start respective processing in response to establishment of a predetermined inspection start condition.

* * * * *